United States Patent [19]

Sawaragi et al.

[11] Patent Number: 4,650,371

[45] Date of Patent: Mar. 17, 1987

[54] DEVICE FOR ABSORBING THE ENERGY OF FLOATING BODIES APPROACHING THE COAST WALL

[75] Inventors: Toru Sawaragi, Osaka; Masayoshi Kubo, Hyogo; Masamitu Mazaki, Tokyo, all of Japan

[73] Assignee: Giken Kogyo Co., Ltd., Tokyo, Japan

[21] Appl. No.: 660,463

[22] Filed: Oct. 12, 1984

[51] Int. Cl.$^4$ .............................................. B63B 21/00
[52] U.S. Cl. .................................... 405/211; 405/303; 114/219; 267/116
[58] Field of Search ............... 405/211, 212, 195, 303; 114/219, 220; 267/139, 142, 116, 65 R

[56] References Cited

U.S. PATENT DOCUMENTS

| | | | |
|---|---|---|---|
| 3,254,491 | 6/1966 | Levinton | 405/213 |
| 3,658,314 | 4/1972 | Luzsicza | 267/121 |
| 4,043,545 | 8/1977 | Dial et al. | 405/212 X |
| 4,108,046 | 8/1978 | Kiraly | 267/121 X |
| 4,145,019 | 3/1979 | Utecht | 267/121 |
| 4,264,236 | 4/1981 | McConnell | 405/212 X |

FOREIGN PATENT DOCUMENTS 2557964 12/1976 Fed. Rep. of Germany ...... 405/212
0146509 11/1981 Japan .................................. 405/212

Primary Examiner—Dennis L. Taylor
Attorney, Agent, or Firm—Burgess, Ryan & Wayne

[57] ABSTRACT

This invention describes a scheme for absorbing the energy of floating bodies such as ships approaching the coastal wall by providing the coastal wall with fenders made of spring materials along with dash-pots that absorb the energy of the approaching floating body due to liquid resistance so that the energy is first absorbed by the springs of the fender in the form of displacement energy and is then dissipated by the dash-pots. According to this invention, the energy of the approaching body that is to be absorbed by the fender increases as the spring constant of the fender is made small in the conventional devices consisting of only fenders, whereas the device of this invention permits the lowering of the energy to be absorbed by the fenders without having to increase the spring constant whereby the maximum reactive force on the coastal walls is decreased and also the movement of the floating body moored in an asymmetrical mooring system can be decreased because the spring constant of the fender can be flexibly altered so as to become close to the spring constant of the mooring system.

8 Claims, 9 Drawing Figures

DEVICE FOR ABSORBING THE ENERGY OF FLOATING BODIES APPROACHING THE COAST WALL

BACKGROUND OF THE INVENTION (1) Field of the Invention

This invention relates to coastal energy absorption devices for absorbing the kinetic energy of the floating bodies such as ships approaching a coast line.

(2) Description of the Prior Art

Fenders are well known as the devices for absorbing the kinetic energy of ships approaching a coast. These are made of spring materials and are provided on the sides of the coast walls or pier walls so that the impact energy of the ships approaching these walls is absorbed by the springs in the form of displacement energy. Recently, since the ships are becoming larger in size, the spring constants of the fenders are also being increased.

However, if the spring constants of the fenders are increased, although large amounts of kinetic energy can be absorbed from large ships the reactive force on the shore or pier wall will also become very large thereby requiring that these walls be built considerably stronger.

Furthermore, when the fender spring constants are increased, the ratio of the spring constant of the fender to that of the mooring system will also become large, say, from 100:1 to 1000:1, as a result of which the movement of the moored ship due to the force of waves will not be limited to only swaying but also will consist of subharmonic motion which is large movement of the ship with oscillatory periods larger than the characteristic period of the mooring system which is caused by the spring constant of the mooring system being smaller than the spring constant of the fender and by the large assymetry of the mooring system.

SUMMARY OF THE INVENTION

As an available means for relieving an impulsive force of a ship on a pier wall, there is a so-called absorber type system with a dash-pot provided additionally on the fender. However, this system is effective only in relieving the impulsive force of the ship, and no more, and hence, does not compensate for external forces exerted on a ship's motion at the time of mooring. Therefore, the above-mentioned problems where there is only a fender, and particularly, the peculiar motion of the ship, are still not thoroughly solved thereby.

In view of the above-mentioned drawbacks prevailing in conventional devices, it is an object of the invention to provide an energy absorbing device for an approaching floating body wherein a large amount of kinetic energy can be absorbed from an approaching floating body by using a fender with a small spring constant, whereby the maximum reactive force on a pier wall is reduced, and thus, the fender can be reduced in size.

Another object of the invention is to provide an energy absorbing device for a floating body wherein a mooring system is symmetrical, and thus, movement of floating bodies can be minimized.

In order to attain the above-mentioned objects, the invention relates to an improvement characterized by a fender for absorbing kinetic energy of an approaching floating body, the fender including spring means disposed on a side surface of a coastt or pier wall, and displaceable by the approaching body; dash-pot means on the side surface for dissipating the energy by means of a resistance of internal fluids; and the fender has a spring constant K0 with a magnitude substantially close to the magnitude of a spring constant K1 of a mooring system for the floating body, thereby decreasing the quantity of energy to be absorbed by the device at the time of a mooring operation and also considerably decreasing motion of the floating body due to fluctuating external forces.

DETAILED DESCRIPTION

The following is a detailed description of this invention based on the examples of application shown in the figures below.

Figure 1:
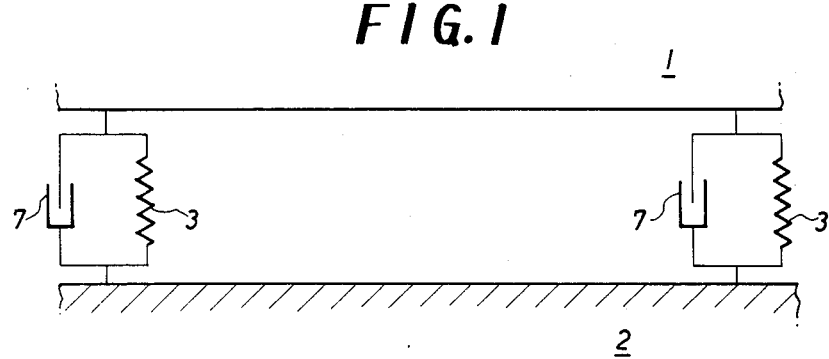
FIG. 1 shows the schematic outline of the device of this invention in a sample application.
Figure 2:
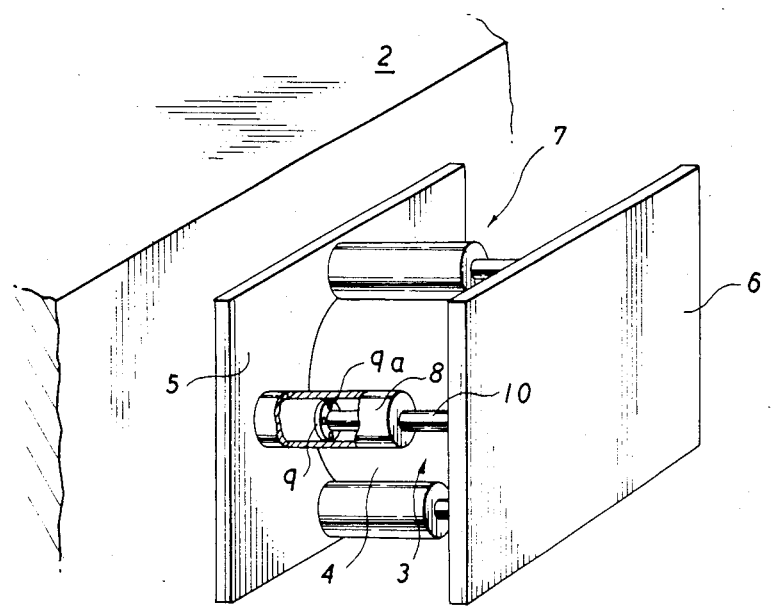
FIG. 2 shows the isometric view of an actual device of FIG. 1.

FIGS. 1 and 2 show the device in an example of application of this invention. As can be seen in FIG. 1, such a device consists of fenders 3 and dash-pots 7 installed on the side wall 2 of the coast body 1, so that the fenders 3 and the dash-pots 7 are constructed integrally. Further, the fender 3 is constructed of spring materials 4 made of elastic material such as rubber of length 80 cm and diameter 100 cm, a fixing plate 5 fixed to the rear end of the spring material 4, and a face plate 6 affixed to the other end of the spring material 4, as is shown in FIG. 2. The entire assembly is fixed to the coast side wall 2 by affixing the fixing plate 5 to the former horizontally. As will be apparent from what is described hereinafter, a low spring constant is selected for the fender 3 as compared with a conventional one, which is retained substantially close to a spring constant of the mooring system, that is, with a ratio within the range of about one in several tens up to several tens.

The dash-pots 7 are four in number and are provided at equal intervals around the periphery of the spring material 4 of the fender 3. Each dash-pot 7 consists of a hermetically sealed cylinder 8 containing some gas or viscous fluid whose rear end is affixed to the fixing plate 5, a piston 9 that can move inside the cyliner 8, and a piston rod 10 which is connected at one end to the piston 9 and to the face plate 6 at the other end so that the fixing plate 5 and the face plate 6 are maintained at right angles to each of the dash-pots.

Each of the pistons 9 contains orifices marked 9a in the figure. These orifices result in creating some resistance to the movement of the piston within the cylinder and also serve to reduce the load on the piston rods 10 during such movement of the piston 9. The orifices 9a formed on the piston 9 will not change in number and shape when a fluid or the like passes in a compression process, and hence, are unchanged during any stroke of piston rod 10. Also, it goes without saying that some form of well known technique is used for sealing as well as lubricating the hole in the front end of the cylinder 8 through which the piston rod 10 can move freely.

When the face plate 6 is pressed due to the ship's body 1, the spring material 4 and the dash-pot 7 are compressed simultaneously, and the kinetic energy of the ship's body 1 will not only be converted into the displacement energy of the spring material 4 but is also dissipated due to the resistance of the dash-pot 7. Therefore, compared to a conventional device consisting of only a fender, the spring constant of the spring material 4 of the fender 3 can be made considerably small as is explained below using the graphs shown in FIGS. 3 to 5.

Figure 3:
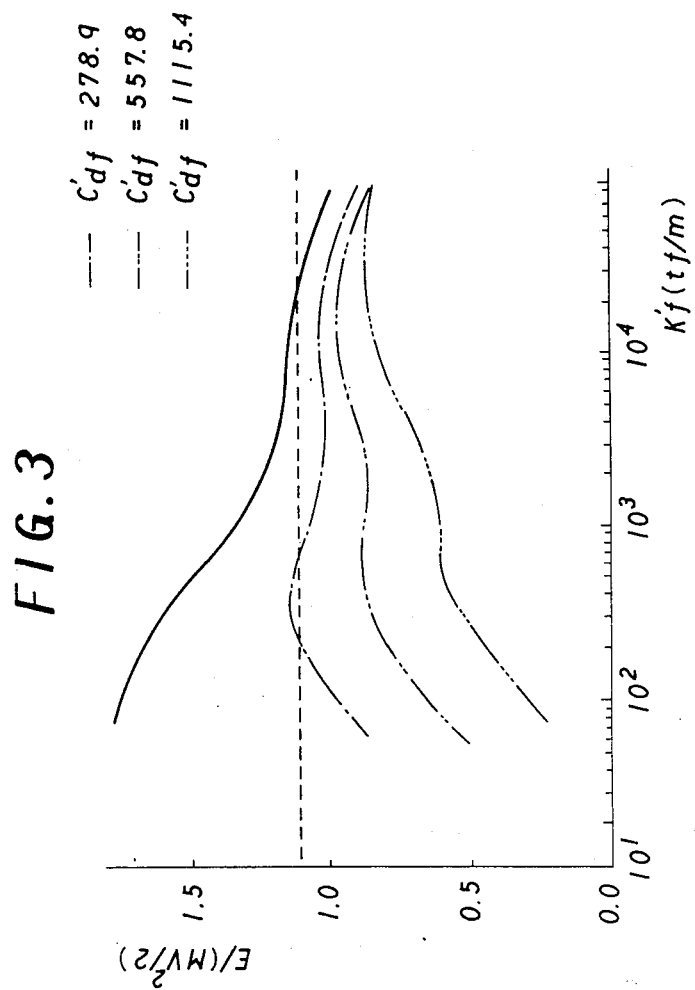
FIG. 3 is a graph showing the energy absorption by the fender from a floating body approaching the coast.
Figure 4:
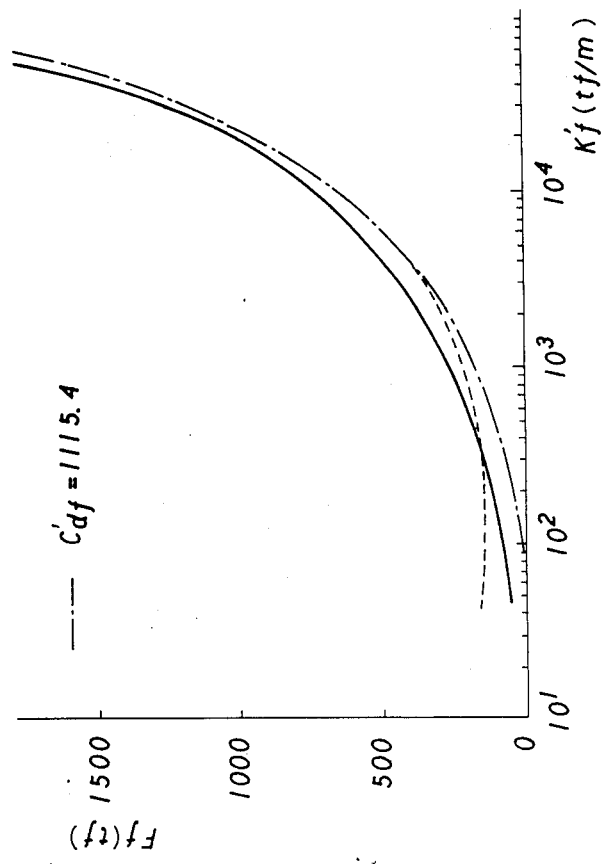
FIG. 4 is a graph showing the maximum recative force acting on the coast walls and the approaching floating body.
Figure 5:
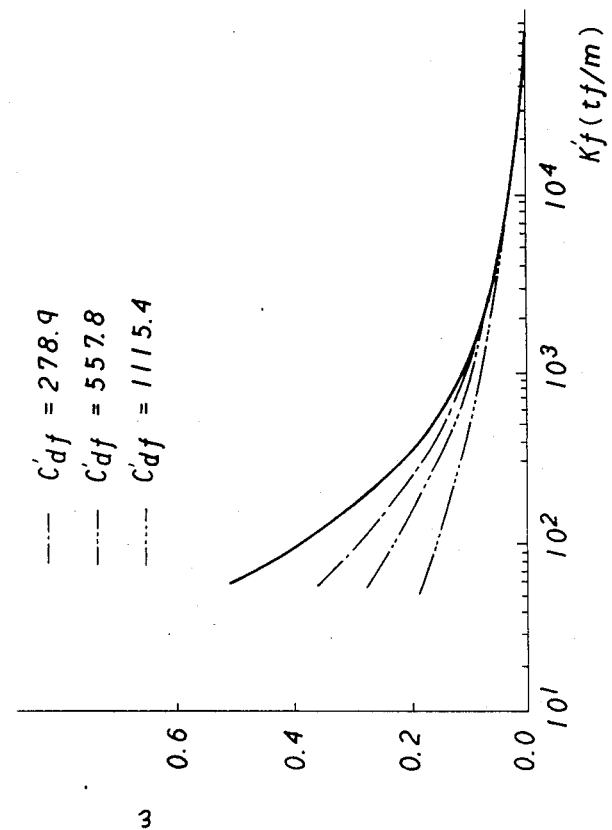
FIG. 5 is a graph showing the displacement of the fender due to the impact of the approaching floating body.

FIGS. 3 to 5 are the results of numerical simulation of the case when the ship is approaching the coast wall with its side surface parallel to the coast wall. The numerical parameters used in the calculation and the method of calculation are as follows.

Parameters used in calculation:
(a) Mooring system model: Ship length (L)=144 m; ship breadth (B)=27.3 m; total depth (D)=18 m; draft (d)=5.4 m; mass (M)=22,000 tons.
(b) Banking model: Distance between ship and shore=4.8 m; ship speed at the time of impact=15 cm/s.

Method of calculation:
Obtained by time-series analysis using the dynamic equations (1) of Cummins:

$$\sum_{j=1}^{6} \left[ (M_{kj} + m_{kj})\ddot{x}_j + \int_{-\infty}^{t} K_{kj}(t - \tau)\dot{x}_j(\tau)d\tau + c_{kj}x_i \right] = f_k(\omega)\cos\omega t$$

$(k = 1, 2, \ldots 6)$ where $M_{kj}$ and $c_{kj}$ are the k-jth elements of the inertial matrix and the hydrostatic reactive force coefficient matrix, respectively. Also, $m_{kj}$ and $K_{kj}(t)$ are the corresponding non-variant mass and delay function coefficients, respectively.

The graph in FIG. 3 shows the relationship between the spring constant of the fender and the energy absorbed as calculated according to the above parameters of calculation and method of calculation, and is drawn with the spring constant $K'_f$ of the fender along the horizontal axis and the kinetic energy E of the ship to be absorbed by the fender (energy absorbed by the device) along the vertical axis. The continuous-line curve is for the conventional device consisting of only the fender, the dashed-line curve with one dot between the dashes is for the case of a fender with dash-pots with the attenuation coefficient of the dash-pot being $C'_{df}$=278.9, tf sec/m the dashed-line curve with two dots between the dashes is for the case of the same fender with dash-pots having an attenuation coefficient of $C'_{df}$=557.8 tf sec/m, the dashed-line curve with three dots between the dashes is for the case of the dash-pots having an attenuation coefficient of $C'_{df}$=1115.4, tf sec/m and the horizontal dashed line indicates the estimated kinetic energy of the ship approaching the coast as calculated according to the equation $E=MV^2/2$ g where M is the virtual weight of the ship evaluated according to Sterlin's equation.

According to this graph, the energy E to be absorbed by the fender varies very sharply with the spring constant $K'_f$ of the fender in the case of the device using only the fender. In particular, in this case, E increases drastically as $K'_f$ becomes small and significantly exceeds the estimated kinetic energy of the ship. Also, as $K'_f$ is increased beyond about 10,000 tf/m, E decreases to values below the estimated kinetic energy of the ship. This is due to the fact that the wave drag decreases as the displacement of the ship increases towards the fender. Therefore, kf a fender with small $K'_f$ is used, E increases despite the fact that the actual energy absorption capability of the fender is low thus rendering the fender ineffective as an energy absorption device. In view of this fact, fenders with larger values of $K'_f$ are used with ships of larger tonnage, etc.

On the other hand, in the case of the devices proposed in this invention, E decreases as the attenuation coefficient $C'_{df}$ of the dash-pots is increased, and the value of $K'_f$ can be freely selected as long as $C'_{df}$ is above 278.9 tf-sec/m since in that case E is always below the estimated kinetic energy of the ship. In addition, this phenomenon is particularly pronounced when $K'_f$ is lower then 500 tf/m. As a consequence, the energy to be absorbed by the fender can be decreased by using dash-pots with high values of attenuation coefficient $C'_{df}$ and a fender with a low value of $K'_f$.

FIG. 4 shows the relationship between the maximum reactive force on the coast wall as well as on the ship body and the spring constant $K'_f$ of the fender. The graph is plotted with the spring constant $K'_f$ along the horizontal axis and the above mentioned reactive force $F_f$ along the vertical axis. The continuous-line curve is for the conventional device while the dashed-line curve with one dot between the dashes is for the device of this invention and shows the reactive force component of the fender only. The dashed-line curve represents the reactive force of the combination of the fender and the dash-pots in this invention. ($C'_{df}$ of the dash-pots is 1115.4 tf-sec/m.)

According to this figure, it is obvious that the peak value of the reactive force is lower in a device built according to this invention than in a conventional device. In addition, it should be noted that the actual value of $K'_f$ of the fender used in a device of this invention is much lower than that of the fender used in a conventional device and hence the lowering of the reactive force is much more significant than a first glance of these curves indicate.

FIG. 5 is a graph showing the relationship between the relative displacement of the fender (shown along the vertical axis) and the spring constant $K'_f$ of the fender (shown along the horizontal axis). The various curves in this graph have the same connotation as the curves in FIG. 3.

As can be seen from this figure, the relative displacement increases as the spring constatn $K'_f$ is decreased. However, it is obvious that the change in the relative displacement with a corresponding change in the spring constant is much smaller in a device with dash-pots as per this invention. Therefore, it can be concluded that even if a fender with the same spring constant is used in a device as per this invention as a fender in a conventional device, the overall size of the device can be reduced.

Next, the following table shows the comparison of a number of data obtained for the conventional device and a device according to this invention at the time of impact between the ship and the coast wall and at the time of mooring when the ship is swaying due to the force of waves. (V=15 cm/sec when the ship is approaching the coast wall, and T=14 seconds and H=1.2 m when the ship is moored.) The data in the column marked (A) is for a conventional device in which case the mooring system is considerably assymmetrical since the spring constant of the fender is $K'_f = 2,939$ tf/m and the spring constant of the mooring lines $K'_1$ is 3.7 tf/m. The data in the column marked (B) is for a device according to this invention in which case $K'_1 = 3.7$ tf/m, $K'_f = 73.4$ tf/m, and the attenuation coefficient of the dash-pots is $C'_{df} = 279$ tf-sec/m.

| | | (A) | (B) |
|---|---|---|---|
| At the time of approaching the coast wall | Energy absorbed by fender (tfm) | 29.6 | 13.6 |
| | Peak reactive force of fender (and dash-pot) (tf) | 208.5 | 41 |
| | Maximum displacement of fender(m) | 0.14 | .06 |
| During swaying under the moored condition | Sway amplitude (m) | 27.9 | 4.1 |
| | Peak reactive force of fender (and dash-pot) (tf) | 1300 | 163.1 |
| | Maximum tension on the mooring lines (tf) | 97.0 | 7.1 |

From the above table it is apparent that in the case of the device built according to this invention, not only the peak reactive force on the coast walls is reduced but also the amplitude of swaying of the ship when moored is lower.

Figure 6:
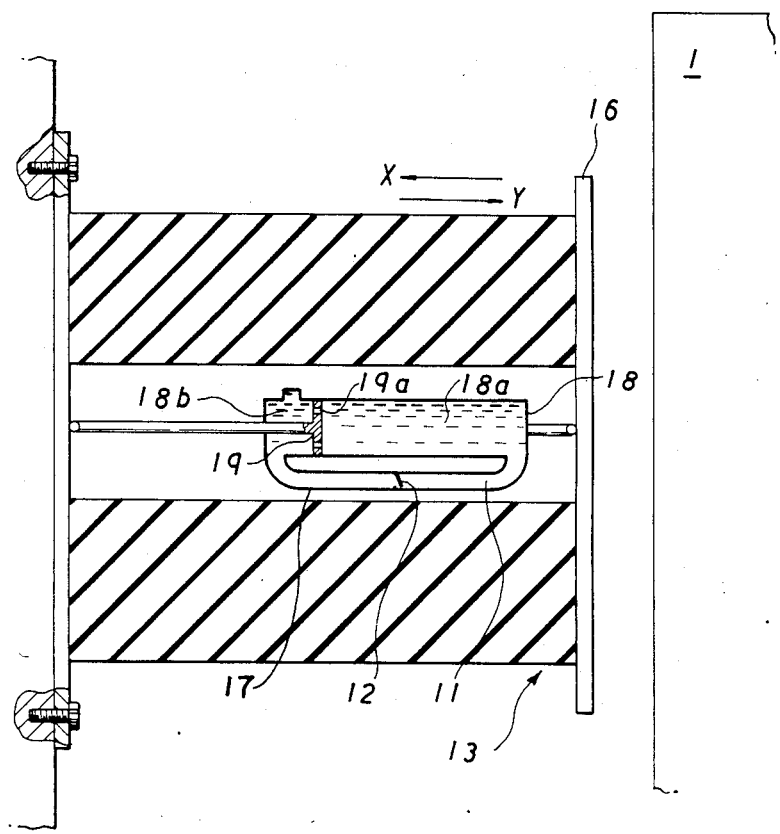
FIG. 6 shows the cross-sectional view of the device in another example of application of this invention.
Figure 7:
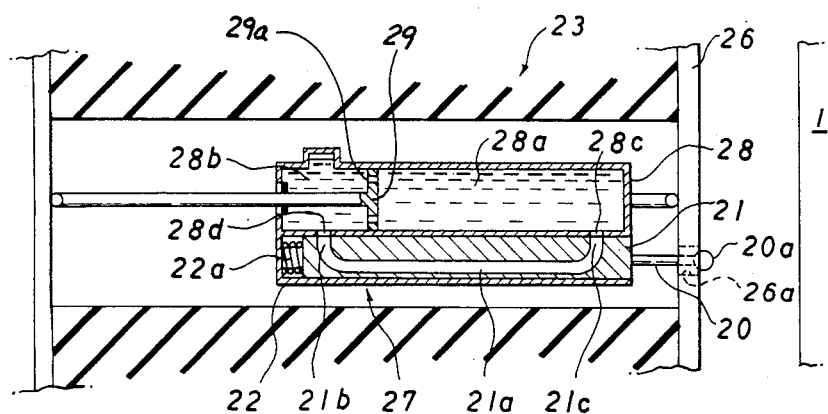
FIG. 7 shows the cross-sectional view of the device in yet another example of application of this invention.

FIGS. 6 and 7 show two other examples of application of this invention in both of which dash-pots 17 and 27 are provided within the fenders 13 and 23, and these dah-pots and fenders are made so that they return to their normal shapes after being compressed once due to the impact between the ship and the coast wall before the ship collides again with the coast wall.

Firstly, in the example of application shown in FIG. 6, the dash-pot 17 is constructed such that a bypass path 11 is provided below the sealed cylinder 18. This bypass path 11 links the compression chamber 18a and the expansion chamber 18b of the cylinder 18. Within this bypass path 11 is provided a one-way valve 12 which gets closed when the piston 19 moves in the direction of the arrow Y so as to compress the fluid in the cylinder's compression chamber 18a, and gets opened when the piston 19 moves in the opposite direction marked by the arrow X.

As a result of this construction, when the face plate 16 gets compressed toward the coast wall due to the impact of the ship, the one-way valve 12 in the bypass path 11 will become closed and the fluid in the compression chamber 18a flows slowly into the expansion chamber 18b via the orifices 19a in the piston 19 thereby causing the impact energy of the ship to be dissipated.

Next, when the ship recoils and moves away from the device, both the dash-pot and the fender start to go back to their original shapes. At this time, since the one-way valve 12 in the bypass path 11 gets opened, the fluid in the dash-pot 17 does not offer any resistance to the movement of the piston and quickly returns to the compression chamber 18a, and hence the dash-pot 17 returns quickly and easily to its normal position due only to the force of the fender 13.

In the application example shown in FIG. 7, below the cylinder 28 of the dash-pot 27 is provided an auxiliary cylinder 22 which houses in it in a freely movable fashion a bypass path body 21 to be described further below. The said bypass path body 21 inserted within the auxiliary cylinder 22 contains a bypass path 21a which links the expansion chamber 28b and the compression chamber 28a of the cylinder 28. Also, an actuating rod 20 is fixed to the side of the bypass path body 21 facing the side of the device that opposes the approaching ship's side wall. The other end of the bypass path body 21 butts against a spring 22a within the auxiliary cylinder 22.

The front end 20a of the above mentioned actuating rod 20 passes through a large enough hole 26a in the face plate 26 and projects beyond the surface of the face plate 26. When the side of the ship comes into contact with the face plate, it first pushes in the actuating rod against the force of the spring 22a whereby the bypass path body 21 will be moved in the leftward direction in the figure. On the other hand, when there is no load on the dash-pot 27 the bypass body 21 will be in such a position that the bypass path 21a in it links the compression chamber 28a and the expansion chamber 28b of the cylinder 28. But, when the actuating rod 20 has been pushed in due to the pressure of the side wall of the ship on the front end 20a of the actuating rod 20, the two openings 21c and 21b of the bypass path 21a will move away from the two openings 28c and 28d in the wall of the cylinder 28 thereby isolating the compression chamber 28a and the expansion chamber 28b of the cylinder 28. In this condition, the extent of linkage between the two chambers of the cylinder can be varied from completely closed to partially closed by appropriately selecting the amount of projection of the front end 20a of the actuating rod 20.

Further, in this example of application of this invention when the ship approaches the facing plate 26 of this device, it first closes the byapass path between the two chambers of the cylinder 28 of the dash-pot 27 and the operation of the dash-pot thereafter when the face plate 26 is further pushed in will be the same as in the previous examples of application of this invention.

Next, when the side wall of the ship's body 1 moves away from the coast wall slowly, the side wall of the ship will still be pushing somewhat against the face plate 26 of this device and hence the bypass path 21a will still remain in the closed state. As a result, the fluid in the expansion chamber 28b of the cylinder 28 can only return to the compression chamber 28a via the orifice 29a in the piston 29. This causes resistance to the reverse movement of the piston and slows down the fender and the dash-pot from returning to their original positions closely following the movement of the ship away from the face plate.

However, if the ship's side wall moves away from the face plate 26 faster than the natural rate of reversal of this device to its normal shape, then the pressure on the front end 20a of the actuating rod 20 will be released whereby the bypass path body 21 quickly returns to its normal position due to the force of the spring 22a and the bypass path 21a will be opened thereby bringing the fluid in the cylinder 28 to equilibrium quickly. This ensures that there will be no delay in the device returning to its normal position.

Therefore, in this example of application of this invention, it is not only possible to make the fender and dash-pot revert to their normal positons in accordance with the rate of movement of the ship away from the device, but also possible to reduce the force of the fender trying to push the ship back into the bay.

It is also to be noted that in this invention although the attenuating power of the dash-pot 27 is being controlled by the orifice 29a in the piston 29, it can be further controlled by the adjustment of the motion of the bypass path body 21a. In addition, the orifice 29a in the piston 29 can be eliminated altogether by making the area of overlap between the openings in the cylinder 28 and the openings in the bypass path 21a vary continuously with the movement of the bypass path body 21.

Figure 8:
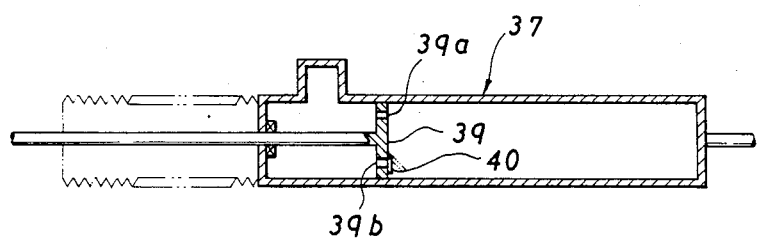
FIG. 8 shows the cross-sectional view of the dash-pot used in another example of application of this invention.

FIG. 8 shows another example of the return path for the fluid in the cylinder in the application examples of FIGS. 6 and 7. In the scheme shown in FIG. 8, no bypass path is provided as the return path for the fluid, but a large diameter connecting path 39b is provided in the piston 39 itself along with the orifice 39a, and closing this connecting path 39b when the dash-pot 37 is compressed and opening when the dash-pot is released by providing a one-way valve 40 in front of the connecting path 39b on the compression chamber side of the piston. The operation of this device too will be equivalent to that of the device described above, except that in this case the construction of the dash-pot becomes much simpler.

In all the application examples shown in FIGS. 6 to 8, the maximum reactive force on the coast walls will be reduced and the amplitude of swaying of the ship will be reduced in the moored condition, as was explained for the application example of FIG. 1.

Figure 9:
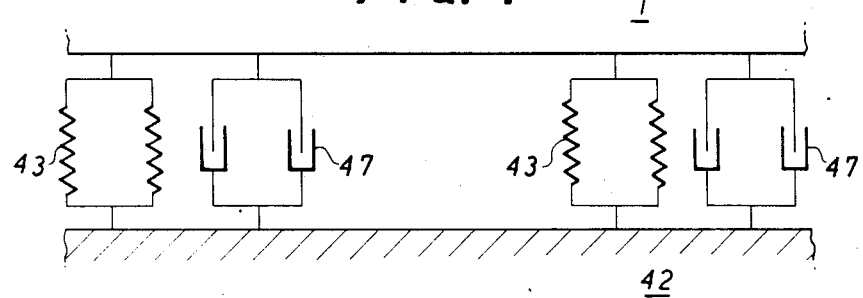
FIG. 9 shows the schematic diagram of yet another example of application of this invention.

FIG. 9 shows the schematic diagram of another example of application of this invention. In this example, the dash-pot 47 is not built integrally with the fender 43, but the two are provided separately from each other on the coast wall but close to each other on the coast wall 42. In this example, two sets of fenders 43 and dash-pots 47 are provided and operate in the same manner as the example of application described in FIG. 1 with the same results.

As described above, according to the invention, a fender for absorbing energy of an approaching floating body by means of a spring displacement action is disposed on the side wall of a coast or pier, and dash-pots for dissipating the energy by means of the resistance of internal fluids are also provided additionally thereon, thereby decreasing the quantity of energy to be absorbed by the device at the time of a mooring operation. Therefore, a fender with a small spring constant can be used; the fender can thus be reduced in size; the maximum reactive force to a pier or the like at the time of a mooring operation is decreased; and thus, coastal energy of big ships can be absorbed securely without enhancing the strength of the pier wall particularly therefor.

Further, since a spring constant of the fender is kept substantially close to the spring constant of a mooring system, the mooring system will be symmetrical, and thus, movement of the floating body due to waves, or particularly, a swaying due to subharmonic motion can be decreased.

This invention has been described in the above paragraphs using several examples of application. However, the scope of the novel concepts of this invention is not to be construed to be limited to the examples described herein since many more design modifications can be effected based on the spirit of this invention.

What is claimed is:

1. A device for absorbing energy from an approaching floating body, comprising:
    a fender for absorbing kinetic energy of said approaching floating body, said fender including spring means disposed on a side surface of a coast or pier wall and displaceable by said approaching floating body;
    dash-pot means on said side surface for dissipating said energy by means of a resistance of internal fluid; and
    said fender has a spring constant K0 with a magnitude substantially close to the magnitude of a spring constant K1 of a mooring system for the floating body, thereby decreasing the quantity of energy to be absorbed by the device at the time of a mooring operation and also considerably decreasing motion of said floating body due to fluctuating external forces after mooring.

2. The energy absorbing device as defined in claim 1, wherein said dash-pot means includes at least one cylinder on said side surface, a piston slidably positioned in each cylinder, fluid in each cylinder and a fluid bypass path body mounted slidably and longitudinally of each cylinder, said body having two openings which communicate with a respective compression chamber and expansion chamber of each respective cylinder when said dash-pot means is in an uncompressed, normal state and which are closed when said dash-pot means is in a compressed state.

3. An energy absorbing device as defined in claim 1, with said dash-pot means being integral with the said fender.

4. An energy absorbing device as defined in claim 1, with said dash-pot means and fender being provided independently from each other, but near each other.

5. An energy absorbing device as defined in claim 1, with said dash-pot means containing paths for the internal fluid in the form of at least one orifice in a piston slidably inserted in a cylinder of said dash-pot means, and in the form of a return path that links a compression chamber and an expansion chamber of the cylinder and that is closed when the device is being compressed and is opened when the device reverts to its normal shape.

6. An energy absorbing device as defined in claim 5, with the return path for the fluid being a bypass path between the compression chamber and the expansion chamber of the cylinder, which bypass path contains a one-way valve in that it allows flow of the internal fluid only from the expansion chamber to the compression chamber.

7. An energy absorbing device as defined in claim 5, with the return path for the internal fluid being provided in a bypass path body that is always in contact with the cylinder and can move in a direction parallel to the axis of the cylinder, and said bypass path body having openings linking the expansion and compression chambers of the cylinder, which openings are so located that they are closed or constricted when the dash-pot means is compressed and are opened when the dash-pot means reverts to its normal state.

8. An energy absorbing device as defined in claim 5, with the return path for the internal fluid being provided by a large sized opening in the piston and said opening in the piston is provided with a means on the compression chamber side of the piston for preventing flow of the fluid from the compression chamber to the expansion chamber.

* * * * *